United States Patent

[11] 3,581,602

| [72] | Inventor | Eugene P. Bachmann<br>Bloomfield, Conn. |
|---|---|---|
| [21] | Appl. No. | 812,513 |
| [22] | Filed | Feb. 3, 1969 |
| [45] | Patented | June 1, 1971 |
| [73] | Assignee | The Birken Manufacturing Company<br>Bloomfield, Conn. |

[54] INDEXING APPARATUS
15 Claims, 7 Drawing Figs.

[52] U.S. Cl............................................. 74/822,
74/45, 74/45.1
[51] Int. Cl................................................. B23q 17/18
[50] Field of Search........................................... 74/822,
817, 816, 815, 814, 813, 130; 77/64; 192/45, 45.1

[56] References Cited
UNITED STATES PATENTS
2,566,243  8/1951  Nyquist..................... 74/817X

| 2,826,099 | 3/1958 | Scholin et al. ................ | 74/822 |
| 3,085,452 | 4/1963 | Thompson.................... | 74/822 |
| 3,309,944 | 3/1967 | Vangor........................ | 74/822 |

*Primary Examiner*—Milton Kaufman
*Assistant Examiner*—F. D. Shoemaker
*Attorney*—McCormick, Paulding and Huber ABSTRACT: An indexing apparatus for a machine tool or the like and having a rotatable index table, a compact rack and pinion drive mechanism including a unitary clutch for indexably moving said table to a plurality of approximate index positions relative to a work station, and mechanism for accurate positioning and holding the table in its various index positions and comprising a plurality of circumaxially spaced pins projecting from the table and one or more pin-engaging elements or yokes for selective engagement with the aforesaid pins. The table is angularly adjustable relative to the drive mechanism so that the number of index positions and the angular spacing therebetween may be readily varied.

PATENTED JUN 1 1971

INVENTOR.
EUGENE P. BACHMANN

BY
McCormick, Paulding & Huber
ATTORNEYS

INDEXING APPARATUS

BACKGROUND OF THE INVENTION

This invention relates in general to indexing apparatus and deals more particularly with an improved rotatable indexing apparatus adapted for use with a machine tool or the like.

The general aim of the present invention is to provide an apparatus of the aforedescribed type which is readily adjustable to accurately present a workpiece in a great variety and number of index positions with respect to a work station on a machine tool or the like and which in comparison to present structures of the same general type is of simpler construction and lower manufacturing cost, while nevertheless exhibiting qualities the same or better than present structures.

SUMMARY OF THE INVENTION

In accordance with the present invention, an indexing apparatus is provided comprising a rotatable index table, drive means for indexably moving the table to a plurality of approximate index positions, a unitary clutch mechanism drivingly connecting said drive means and said table, positioning and holding means for accurately aligning and releasably retaining the table in its various index positions and sensing means responsive to movement of the table to an approximate selected index position for operating the positioning and holding means. A means is also provided for angularly adjusting the table relative to both the drive means and the positioning and holding means to vary the number of index positions relative to a fixed work station or the like and the angular spacing between the various index positions.

DETAILED DESCRIPTION OF THE PREFERRED EMBODIMENT

Figure 1:
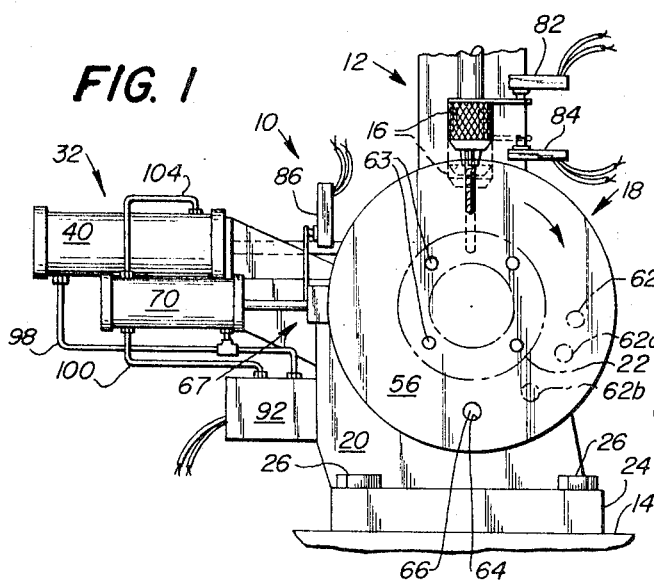
FIG. 1 is a fragmentary front elevational view of a portion of a machine tool with an indexing apparatus embodying the present invention mounted on the work table thereof.
Figure 2:
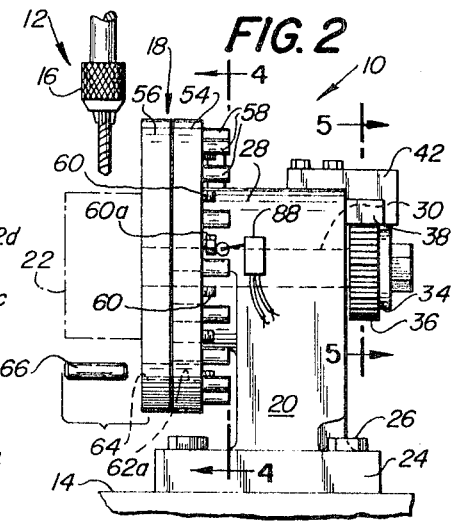
FIG. 2 is a fragmentary side elevational view of the machine tool and indexing apparatus of FIG. 1.
Figure 3:
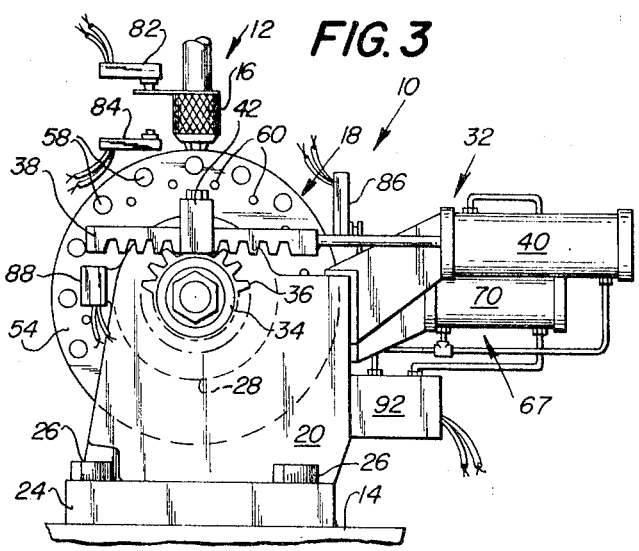
FIG. 3 is a fragmentary rear elevational view of the machine tool and indexing apparatus of FIG. 1.

Turning now to the drawings and referring particularly to FIGS. 1—3, an indexing apparatus embodying the present invention is generally designated by the reference character 10. The apparatus 10 is particularly adapted for use with a machine tool or the like to support and indexably move one or more workpieces relative to a work station on the machine. For the purpose of illustration, the apparatus 10 is shown mounted on a machine tool or drill press indicated generally at 12 and having a horizontally disposed work-supporting table 14 and a power-operated tool spindle 16 carrying a toll or drill and arranged for vertical movement relative to the table 14.

The apparatus 10 has an indexing table indicated generally at 18 rotatably supported on a frame 20 and adapted to support a workpiece 22 for indexable movement about an axis and relative to the tool spindle 16. In the illustrated case, the indexing table 18 is supported for rotation about a generally horizontally disposed axis, however, it may be arranged with its axis otherwise oriented and such arrangement is contemplated within the scope of this invention. The frame 20 has a base portion 24 secured to the table 14 by fasteners 26, 26 and includes an integral boss 28 providing a journal for a drive shaft 30 which extends horizontally therethrough.

The table 18 is drivingly supported by the shaft 30 and arranged for indexable or intermittent advancement in a clockwise direction, as indicated by the arrow in FIG. 1, to a plurality of successive index positions relative to the tool spindle 16. This intermittent advancement is effected by a reciprocating drive mechanism designated generally by the numeral 32 and operably connected to the shaft 30 through a clutch 34. The drive mechanism 32 includes a pinion 36 and a rack 38 drivingly engaging the pinion and connected to a reciprocating piston rod on a fluid motor or double acting pneumatic cylinder 40 mounted on the frame 20. A bearing block 42 fastened to the boss 28 maintains the rack 38 in driving engagement with the pinion 36 as best shown in FIGS. 2 and 3.

Figure 5:
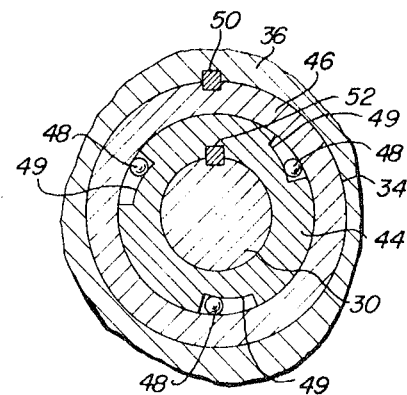
FIG. 5 is a fragmentary sectional view taken along the line 5—5 of FIG. 2.

One feature of the invention resides in the novel arrangement of the clutch with respect to the aforesaid drive mechanism. Specifically, the clutch 34 is of a unitary type which includes concentrically arranged annular inner and outer parts respectively indicated at 44 and 46 in FIG. 5. In a clutch of the aforesaid type the two parts may be operably connected in various ways so that rotation of one of the parts in one and an opposite direction causes rotation of the other part in only one direction. The clutch 34 is of a roller type, driving connection between the inner and outer parts being established by a plurality of rollers 48, 48. Each roller 48 acts between the inner surface of the outer part 46 and a plane 49 associated with the inner part 44 and inclined relative to the latter surface. The outer part 46 is received in a coaxial cylindrical recess in the pinion 36 and forms a hub for the pinion, driving connection between the pinion and the outer part 46 being provided by a key 50. The inner part 44 is drivingly connected to the shaft 30 by a key 52 and drives the shaft as the rack 38 moves outwardly or away from the cylinder 40 on its power stroke, however, no driving force is transmitted to the shaft 30 by the inner part 44 as the rack retracts or moves toward the cylinder 40 on its return stroke. While the drive mechanism 32 has been illustrated and described with reference to a typical roller clutch, a Formsprag clutch of the type manufactured by the Formsprag Clutch Company has been found particularly well suited for establishing the aforedescribed driving connection.

The indexing table may take various forms and may, for example, comprise a single rotatably supported member adapted to support a workpiece, but preferably and as shown, the index table 18 comprises two plates or discs 54 and 56 coaxially mounted in face-to-face relation on the shaft 30. The rear disc 54 is keyed to and driven by the shaft 30 and has a circumaxially spaced series of generally cylindrical pins 58, 58 projecting rearwardly therefrom in a generally axial direction. Each pin 58 corresponds to an index station as will be hereinafter evident. The number of pins and the angular spacing therebetween will vary in accordance with the number and arrangement of index positions desired. In the illustrated case, the rear disc 54 has 16 equiangularly spaced pins 58, 58 to provide at least 16 index positions of the plate 18 relative to the tool spindle 16.

A circumaxially spaced series of cam screws 60, 60, and 60a equal in number to the number of pins 58, 58 are threadably received in the rear surface of the disc 54. The angular spacing between each adjacent pair of cam screws 60, 60 is substantially equal to the angular spacing between a corresponding pair of adjacent pins 58, 58. Each cam screw 60 is threadably adjustable inwardly and outwardly relative to the disc 54 between a projected position wherein the screw extends rearwardly beyond the rear surface of the disc 54 and in a generally axial direction and a retracted position wherein the head of the cam screw is substantially flush with the rear surface of the disc 54. At this point, it should be noted that the cam screw designated at 60a and best shown in FIG. 6 has an enlarged head. This screw cooperates with a switch as hereinafter described to provide a means for stopping the apparatus 10 upon completion of one full rotation or indexing cycle of the table 18. A plurality of circumaxially spaced cylindrical apertures designated at 62a, 62b, 62c and 62d extend through the rear plate 54 in a generally axial direction. The angular spacings between each pair of adjacent apertures in the series 62a—62d differs from the angular spacing between each other adjacent pair of apertures in the series and from the angular spacing between adjacent pairs of pins 58, 58.

The front plate 56 is supported on the shaft 30 and arranged to turn freely thereon so that it may be angularly adjusted relative to the rear plate 54. Threaded apertures 63, 63 are provided in the front surface of the front disc to receive fasteners (not shown) for securing the work piece 22 to the table 18. A single generally cylindrical aperture 64 extends through the front disc 56 in circumaxial alignment with the apertures 62a—62d. The front and rear discs are secured together in various angular relationships for rotation in unison by a pin 66 inserted through the aperture 64 and selectively engaging one of the apertures 62a—62d.

Figure 4:
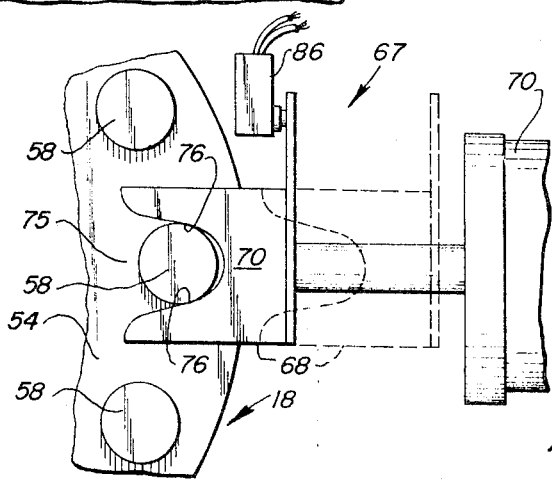
FIG. 4 is a fragmentary sectional view taken generally along the line 4—4 of FIG. 2.

The apparatus 10 also includes a mechanism indicated generally at 67 for accurately positioning and releasably retaining the table 18 in its various index positions. Referring now to FIG. 4, the mechanism 67 includes a positioning and holding element or yoke 68 for selectively engaging an associated one of the pins 58, 58 to move the table 18 to and hold it in an accurate position corresponding to one of its index positions. The yoke 68 is carried by a reciprocating part or piston rod of a fluid motor or double-acting pneumatic cylinder 70 mounted on the frame 22. It is reciprocally movable radially inwardly and outwardly between a pin engaging or full-line position and a retracted or broken-line position as shown in FIG. 4. At its inner end, the yoke 68 has a generally U-shaped inwardly opening pin-receiving recess 75 partially defined by a pair of opposing pin-engaging surfaces 76, 76. The surfaces 76, 76 diverge toward the open end of the recess 75 and curve outwardly at their terminal ends to form an opening therebetween which has a width substantially greater than the diameter of a pin 58. The yoke 68 is further arranged so that portions of the surfaces 76, 76 tangentially engage the peripheral surface of an associated pin 58 with some space or clearance remaining between the bottom of the recess 75 and the pin. Due to the diverging arrangement of the surfaces 76, 76, an associated pin 58 tends to center itself within the recess 75 as the yoke moves into engagement with the pin. This centering action effects angular movement of the table 18 such as may be necessary to achieve an accurate index position of the table relative to the tool spindle 16.

Figure 6:
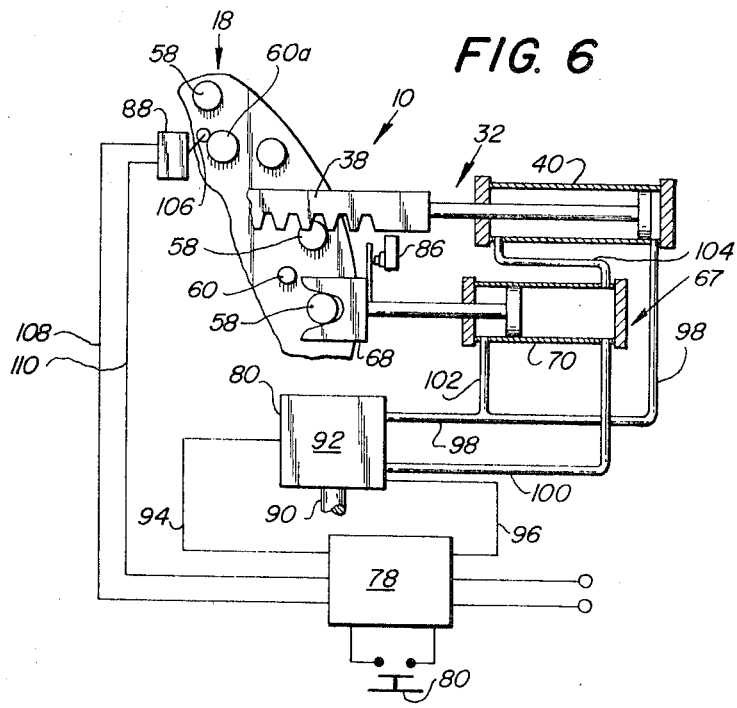
FIG. 6 is a somewhat schematic fragmentary elevational view of the indexing apparatus of FIG. 1 and shows a portion of the drive means for rotating the table and the means for accurately positioning and holding the table.

It will be evident that various arrangements may be provided for controlling the operation of the apparatus hereinbefore described. Referring now particularly to FIG. 6, a control system for the apparatus 10 is illustrated somewhat schematically and has an electrical portion and a pneumatic portion. The electrical portion of the system includes an electrical control unit 78 which may and preferably does comprise a part of the control unit for the machine 12. The unit 78 has a starting switch 80 and also includes a plurality of sensing devices or electrical switches for sequentially controlling the operation of the various mechanisms which comprise the apparatus 10. Thus, the control unit 78 includes a pair of switches 82 and 84 responsive to the movement of the tool spindle 16, another switch 86 associated with the mechanism 67 and still another switch 88 for detecting angular movement of the table 18 to control operation of the drive mechanism 32 and the holding and positioning mechanism 67 as will be hereinafter further discussed.

Considering now the pneumatic portion of the control system, fluid under pressure enters the fluid motors 40 and 70 through a line 90 and through a solenoid-operated distribution valve 92 electrically connected to the control unit 78 by lines 94 and 96. The distribution valve 92 selectively controls the flow of fluid through and the exhaust of fluid from one or the other of a pair of fluid lines indicated at 98 and 100, respectively. The line 98 is connected to the fluid motor 40 on the right-hand side of its piston and is also connected by a branch line 102 to the fluid motor 70 on the left-hand side of its piston, as oriented in FIG. 6. The line 100 connects the valve 92 to the fluid motor 70 on the right-hand side of its piston. Another line 104 connects the right-hand side of the fluid motor 70 with the left-hand side of the fluid motor 40. The valve 92 is arranged to selectively admit fluid under pressure from the line 90 to one of the lines 98 and 100 and simultaneously exhaust fluid from the other of the latter two lines in response to an electrical signal from either the starting switch 80 or the sensing switch 88. The latter switch is supported on the frame 20, has an actuating member 106 positioned in the path of the cam screws 60, 60 and 60a is electrically connected to the control unit 78 by lines 108 and 110.

At the start of the machine cycle, the fluid motors 40 and 70 are positioned generally as shown in FIG. 6, the tool spindle 16 is in its raised or full-line position in engagement with the switch 82 as shown in FIG. 1 and 3 and the switch actuating member 106 is in engagement with the enlarged head of the cam screw 60a. The indexing cycle is initiated by actuating the starting switch 80 which energizes the valve 92 to reverse the flow of fluid therethrough and admit fluid under pressure to the lines 98 and 102 while simultaneously exhausting fluid from the lines 100 and 104. At this point, it should be noted that the indexing cycle cannot be initiated unless the spindle 16 is in contact with the switch 82 and out of engagement with the work piece 22. Fluid under pressure first enters the fluid motor 70 through the lines 98 and 102 to move the yoke 68 from its pin engaging to its retracted position. Thereafter, fluid enters the motor 40 through the line 98 to drive the rack 38 in the direction of the table 18 and effect rotational movement of the table in a counterclockwise direction, as viewed in FIG. 6. The table 18 continues its angular movement until the switch actuating member 106 engages one of the cam screws 60, 60 to actuate the switch 88 which causes the solenoid valve 92 to reverse the direction of fluid flow through the lines 98 and 100. Fluid then flows into the fluid motors 70 and 40 through the lines 98 and 102 as fluid is simultaneously exhausted from the lines 100 and 104. Due to the pneumatically interconnected arrangement of the fluid motors 70 and 40, pressure buildup occurs first in the motor 70 to cause the piston thereof to move the yoke 68 into engagement with an associated pin 58 which has been previously moved to a position of general alignment with the yoke by the indexing mechanism 32. Thereafter, fluid pressure in the motor 40 retracts the rack 38.

The pin 58 engaged by the yoke 68 tends to center itself within the recess 75 in the manner aforedescribed, thereby accurately aligning the table 18 in one of its indexed positions. When the yoke 68 attains a position of full engagement with an associated pin 58 the switch 86 is actuated by the yoke to establish a holding circuit (not shown) which retains the fluid motors 70 and 40 generally in the positions in which they appear in FIG. 6. The switch 86 also controls the downward movement of the tool spindle 16. If the yoke 68 fails to attain a fully seated position on an associated pin 58 as a result of a metal chip or other foreign object becoming lodged between the pin and the yoke, the switch 86 will not be actuated and the tool spindle 16 will not move into operative engagement with the work piece 22.

When the table 18 is accurately positioned by the yoke mechanism 32, the switch 86 causes the tool spindle 16 to move the drill into operative engagement with the workpiece 20. Upon completion of the machine tool-operating cycle, the spindle engages the switch 84 which reverses the direction of spindle movement, thereupon the drill moves out of engagement with the workpiece 20 and the spindle again engages the switch 82 to effect repetition of the index cycle. The cycle is repeated until the switch actuating member 106 engages the enlarged head of the cam screw 60a. When the table 18 stops in the latter position the actuating member 106 remains in engagement with the enlarged head thereby halting the indexing cycle. To initiate another indexing cycle it is necessary to actuate the starting switch 80.

Upon completion of one indexing cycle the workpiece 22 may then be removed from the table or, if desired, the angular position of the front plate 56 may be adjusted with respect to the rear plate 54 and the indexing cycle repeated to move the workpiece through another set of index positions angularly offset from the first set of positions. Thus, by adjusting the angular position of the front plate 56 with respect to the rear plate 54, the number and relative angular arrangement of index positions with respect to a given workpiece may be varied substantially without removing the workpiece from and repositioning it on the table 18.

The electrical control circuit is preferably further arranged to energize the valve 92 to reverse the flow of fluid through the lines 98 and 100 at the completion of each rack power stroke, so that the table 18 will continue to be intermittently advanced by the indexing mechanism 32 until the switch actuating member 106 engages one of the cam screws 60, 60 or 60a positioned in its path. It will now be evident that the number of index positions and the relative angular arrangement thereof may be further varied by varying the number and position of the cam screws in the path of the actuating member 106 as by threadably adjusting one or more of the screws 60, 60 to retracted position.

Figure 7:
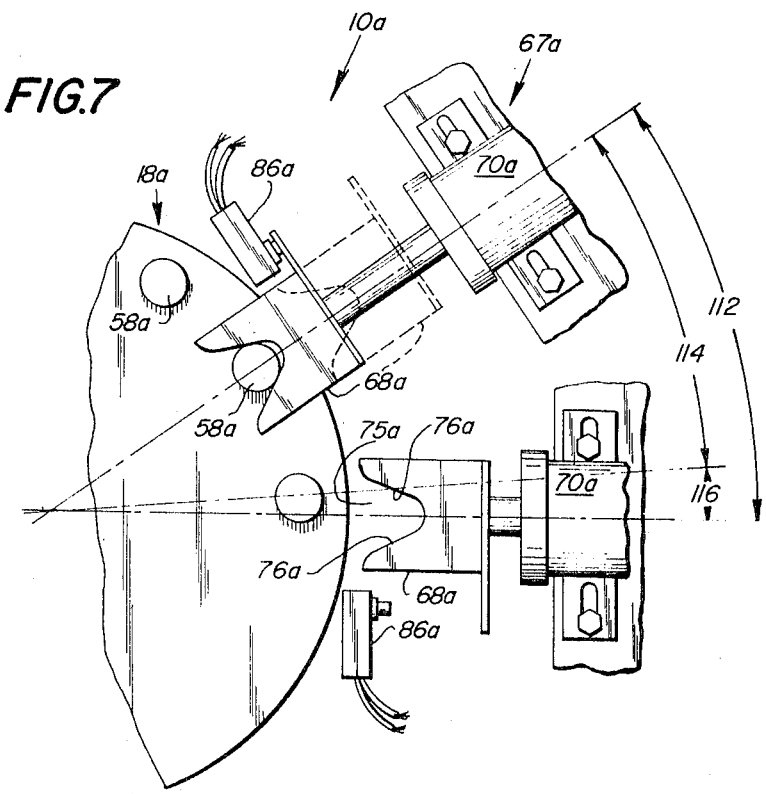
FIG. 7 is generally similar to FIG. 4, but shows another embodiment of the invention.

In FIG. 7 a further embodiment of the invention is illustrated and designated generally by the reference numeral 10a. The apparatus 10a is particularly adapted to provide a plurality of closely spaced index positions and is substantially identical in many respects to the aforedescribed apparatus 10. Parts of the apparatus 10a which are substantially identical to parts previously described bear the same reference numeral and a letter suffix and will not be hereinafter further discussed. The present apparatus includes a plurality of positioning and holding mechanisms 67a, 67a adjustably mounted on the frame of the apparatus, two such mechanisms being shown. Each mechanism 67a includes a yoke 68a movable generally radially inwardly and outwardly between a pin engaging or full line position and a retracted position as indicated in broken lines. The yokes 68a, 68a have an angular spacing 112 therebetween which differs somewhat from the angular spacing between adjacent pairs of pins 58a, 58a, the latter angle spacing being designated at 114. The two yoke mechanisms are electrically connected to a control circuit (not shown) for sequential operation. Thus, after the table 18a has been moved to an approximate indexing position by a drive mechanism such as aforedescribed, one yoke 68a moves to its pin-engaging position to accurately position and hold the table 18a while a tool spindle or the like performs an operation on a workpiece supported on the table 18a. Thereafter, the aforesaid yoke 68 moves to its retracted position and before the table 18a is further advanced by its drive mechanism the other yoke 68a moves inwardly to a position of engagement with an associated pin 60a to effect slight angular movement of the table to another index position. In the illustrated case the table 18a is moved through an angle 116.

I claim:

1. An indexing apparatus for a machine tool or the like having a work station and comprising a rotatable indexing table adapted to support a workpiece for selective indexable movement to a plurality of index positions relative to the work station, a plurality of circumaxially spaced pins projecting from said table, each of said pins corresponding to an associated one of said index positions, at least one positioning and holding means for operatively engaging an associated one of said pins to accurately aligned and releasably retain said table in an index position corresponding to said one pin, drive means movable in one and an opposite direction for indexably moving said table, a unitary clutch mechanism drivingly connecting said index table and said drive means, said clutch mechanism having concentric inner and outer parts and means for rotating one of said parts in only one direction in response to rotation of said other part in one and an opposite direction, said other part being drivingly connected to said drive means, said one part being drivingly connected to said index table for intermittently rotating said table in said one direction in response to the movement of said drive means in said one and an opposite direction, and sensing means responsive to movement of said table to an approximate selected index position for stopping said table and moving said positioning and holding means into engagement with the pin corresponding to said selected index position.

2. An indexing apparatus as set forth in claim 1 wherein said pins are generally cylindrical and said one positioning and holding means comprises a holding element movable radially inwardly and outwardly relative to said one pin between pin engaging and releasing positions, said element having generally opposing pin-engaging surfaces for tangential contact with said one pin in said engaging position.

3. An indexing apparatus as set forth in claim 2 wherein said element comprises a yoke having an inwardly opening pin receiving recess, said pin-engaging surfaces diverging inwardly and partially defining said recess.

4. An indexing apparatus as set forth in claim 1 wherein said sensing means comprises a switch having an actuating member and a plurality of circumaxially spaced cam members associated with said table for preselected engagement with said actuating member, each of said cam members corresponding to an associated one of said index positions.

5. An indexing apparatus as set forth in claim 1 wherein said table comprises two coaxially supported plates, one of said plates being drivingly connected to said drive means and the other of said plates being angularly movable relative to said one plate, and means for releasably retaining said plates in a plurality of selected angular positions relative to each other.

6. In an indexing apparatus the combination comprising a rotatable index table, drive means movable in one and an opposite direction, and a unitary clutch mechanism drivingly connecting said index table and said drive means, said clutch mechanism including concentrically arranged annular inner and outer parts and means for rotating one of said parts in only one direction in response to rotation of said other part in one and an opposite direction, said other part drivingly connected to said drive means, said one part drivingly connected to said index table to rotate said table in said one direction in response to the movement of said drive means in said one and said opposite direction.

7. The combination as set forth in claim 6 wherein said drive means include a rotatable drive member and means for rotating said drive member in one and an opposite direction, said drive member being drivingly connected to said other part, said one part comprising the hub of said drive member.

8. The combination as set forth in claim 7 wherein said drive member is a pinion concentrically mounted on said other part.

9. An indexing apparatus for a machine tool or the like having a work station and comprising a rotatable indexing table adapted to support a workpiece for selective indexable movement to a plurality of index positions relative to the work station, a plurality of circumaxially spaced pins projecting from said table, each of said pins corresponding to an associated one of said index positions, at least one positioning and holding means for operatively engaging an associated one of said pins to accurately align and releasably retain said table in an index position corresponding to said one pin, drive means for indexably moving said table, sensing means responsive to movement of said table to an approximate selected index position for stopping said table and moving said positioning and holding means into engagement with the pin corresponding to said selected index position, and another positioning and holding means for engaging another of said pins and sequentially operable relative to said one positioning and holding means for moving said table to and holding said table in another index position angularly spaced from said selected index position.

10. An indexing apparatus for a machine tool or the like having a work station and comprising a rotatable indexing table adapted to support a workpiece for selective indexable movement to a plurality of index positions relative to the work station, a plurality of circumaxially spaced pins projecting from said table, each of said pins corresponding to an associated one of said index positions, at least one positioning and holding means for operatively engaging an associated one of said pins to accurately align and releasably retain said table in an index position corresponding to said one pin, drive means for indexably moving said table, a switch having an actuating member and operable to stop said table and move said positioning and holding means into engagement with an associated one of said pins, and a plurality of circumaxially spaced cam members associated with said table for preselected engagement with said actuating member to operate said switch, each of said cam members corresponding to an associated one of said index positions.

11. An indexing apparatus as set forth in claim 10 wherein each of said cam members comprises a screw threadably adjustable relative to said table between projected and retracted positions, and engageable with said actuating member in said projected position.

12. An indexing apparatus for a machine tool or the like having a work station and comprising a rotatable indexing table adapted to support a workpiece for selective indexable movement to a plurality of index positions relative to the work station, said indexing table including two coaxially supported plates, one of said plates being angularly movable relative to the other, and means for releasably retaining said plates in a plurality of selected angular positions relative to each other, a plurality of circumaxially spaced pins projecting from said table, each of said pins corresponding to an associated one of said index positions, at least one positioning and holding means for operatively engaging an associated one of said pins to accurately align and releasably retain said table in an index position corresponding to said one pin, drive means drivingly connected to the other of said plates for indexably moving said table, and sensing means responsive to movement of said table to an approximate selected index position for stopping said table and moving said positioning and holding means into engagement with the pin corresponding to said selected index position.

13. An indexing apparatus as set forth in claim 12 wherein said one plate has a pin-receiving aperture therethrough and said other plate has a plurality of circumaxially spaced apertures therein for selective alignment with said aperture in said one plate and said means for releasably retaining said plates comprises a pin inserted through said aperture in said one plate, and selectively engaging one of said apertures in said other plate.

14. An indexing apparatus adapted for connection to and operation in timed relation with a machine tool or the like having a work station, said apparatus comprising a rotatable indexing table adapted to support a workpiece for selective indexable movement to a plurality of index positions relative to the work station, a plurality of circumaxially spaced pins projecting from said table, each of said pins corresponding to an associated one of said index positions, at least one positioning and holding means for operatively engaging an associated one of said pins to accurately align and releasably retain said table in an index position corresponding to said one pin, drive means for indexably moving said table, sensing means responsive to movement of said table to an approximate selected index position for stopping said table and moving said positioning and holding means into engagement with the pin corresponding to said selected index position, and sensing means associated with said holding and positioning means and responsive to movement of said table to said selected index position for controlling the operation of the machine tool.

15. An indexing apparatus for a machine tool or the like having a work station and comprising a rotatable indexing table adapted to support a workpiece for selective indexable movement to a plurality of index positions relative to the work station, a first positioning and holding means for accurately aligning and releasably retaining said table in one index position, second positioning and holding means sequentially operable relative to said first positioning and holding means for moving said table to and holding said table in another index position angularly spaced from said one index position, and sensing means responsive to movement of said table to a position proximate said one index position for operating said positioning and holding means.